(12) United States Patent
Short et al.

(10) Patent No.: US 12,384,217 B1
(45) Date of Patent: Aug. 12, 2025

(54) WATER DRAINAGE SYSTEMS AND METHODS FOR VEHICLES

(71) Applicant: GM GLOBAL TECHNOLOGY OPERATIONS LLC, Detroit, MI (US)

(72) Inventors: Robert Short, Holly, MI (US); Michael Patrick Kirbitz, Holly, MI (US); Bryan J. Miller, Davisburg, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/913,198

(22) Filed: Oct. 11, 2024

(51) Int. Cl.
*B60G 17/017* (2006.01)
*B60G 17/019* (2006.01)

(52) U.S. Cl.
CPC ..... *B60G 17/017* (2013.01); *B60G 17/01908* (2013.01); *B60G 2400/0511* (2013.01); *B60G 2400/0512* (2013.01); *B60G 2400/843* (2013.01); *B60G 2401/27* (2013.01); *B60G 2800/012* (2013.01); *B60G 2800/014* (2013.01); *B60G 2800/20* (2013.01)

(58) Field of Classification Search
CPC .......... B60G 17/017; B60G 2400/0511; B60G 2400/0512; B60G 2400/843; B60G 2800/20
See application file for complete search history.

(56) References Cited

U.S. PATENT DOCUMENTS

| 2017/0203626 A1* | 7/2017 | Guest | B60G 17/0165 |
| 2018/0154726 A1* | 6/2018 | Fida | B60G 17/017 |
| 2019/0210421 A1* | 7/2019 | Ricketts | B60G 17/0164 |

FOREIGN PATENT DOCUMENTS

| CN | 118418634 A | | 8/2024 | |
| CN | 118849995 A | * | 10/2024 | |
| DE | 102014006074 A1 | * | 11/2014 | ........ B60G 17/017 |
| DE | 102017217172 A1 | | 3/2019 | |
| JP | 2008055972 A | | 3/2008 | |

OTHER PUBLICATIONS

Andreas Wylenzek-Meyer, Commercial vehicle with a body, Nov. 6, 2014, EPO, DE 10 2014 006 074 A1, Machine Translation of Description (Year: 2014).*

* cited by examiner

*Primary Examiner* — James A English
(74) *Attorney, Agent, or Firm* — Ingrassia Fisher & Lorenz, LLP (57) ABSTRACT

Systems and methods are provided for draining water from surfaces of vehicles. The systems may include a mechanism onboard the vehicle configured to adjust a pitch angle or a roll angle of the vehicle, and a controller configured to, by one or more processors, determine a stance of the vehicle relative to gravity, and adjust, with the mechanism, the pitch angle or the roll angle of the vehicle to define an adjusted stance of the vehicle sufficient for a surface of the vehicle to exceed a drainage angle and thereby promote a directional flow of water from the surface.

20 Claims, 4 Drawing Sheets

WATER DRAINAGE SYSTEMS AND METHODS FOR VEHICLES

INTRODUCTION

The technical field generally relates to vehicles, and more particularly relates to water drainage systems for draining water from surfaces of vehicles.

Rainwater can cause several issues for vehicles, especially the bed of a pickup truck. Pickup truck beds are often flat which can lead to water pooling during heavy rain. This is especially true if the truck is parked on a level surface or if there are bed liners without drainage holes. Standing water can cause rusting, promote mold or mildew growth, and damage cargo left in the bed. Some truck beds have electrical components such as lighting, backup cameras, or power outlets.

Accordingly, it is desirable to provided systems and methods that are capable of promoting water drainage from surfaces of vehicles, such as pickup truck beds. Furthermore, other desirable features and characteristics of the present disclosure will become apparent from the subsequent detailed description and the appended claims, taken in conjunction with the accompanying drawings and the foregoing introduction.

SUMMARY

A method is provided for draining water from a surface of a vehicle. In one example, the method includes determining, with a controller having one or more processors, a stance of a vehicle relative to gravity, and adjusting, with a mechanism of the vehicle, a pitch angle or a roll angle of the vehicle to define an adjusted stance of the vehicle sufficient for a surface of the vehicle to exceed a drainage angle and thereby promote a directional flow of water from the surface.

In various examples, the method may include monitoring, with the controller having the one or more processors, for first criteria, wherein determining the stance of the vehicle relative to gravity is performed in response to detection of the first criteria. In various examples, the first criteria may include the vehicle being in park and an indication of a presence of water on the surface, based on signals received by the controller from one or more sensors onboard the vehicle. In various examples, the method may include maintaining an active state of the one or more sensors while a battery module of the vehicle is charging. In various examples, the method may include selecting a first feature mode from more than one feature modes prior to monitoring for the first criteria, wherein the first criteria are defined by the first feature mode.

In various examples, the method may include selecting, with the controller having the one or more processors, a stance adjustment mode based on the stance of the vehicle, wherein adjusting the pitch angle or the roll angle of the vehicle to define the adjusted stance is performed based on the stance adjustment mode.

In various examples, the method may include monitoring, with the controller having the one or more processors, for second criteria, wherein adjusting the stance of the vehicle is performed in response to detection of the second criteria. In various examples, the second criteria includes the vehicle being shutdown and an indication of a driver having exited the vehicle, based on signals received by the controller from one or more sensors onboard the vehicle.

In various examples, the method may include generating, with the controller having the one or more processors, a notification indicative of the adjusted stance of the vehicle.

In various examples, the mechanism of the method may be a suspension system of the vehicle.

A system is provided for water drainage for a vehicle. In one example, the system includes a mechanism onboard the vehicle configured to adjust a pitch angle or a roll angle of the vehicle, and a controller configured to, by one or more processors, determine a stance of the vehicle relative to gravity, and adjust, with the mechanism, the pitch angle or the roll angle of the vehicle to define an adjusted stance of the vehicle sufficient for a surface of the vehicle to exceed a drainage angle and thereby promote a directional flow of water from the surface.

In various examples, the controller of the system may be configured to, by the one or more processors, monitor for first criteria, and determine the stance of the vehicle relative to gravity in response to detection of the first criteria. In various examples, the first criteria may include the vehicle being in park and an indication of a presence of water on the surface, based on signals received by the controller from one or more sensors onboard the vehicle. In various examples, the controller may be configured to, by the one or more processors, maintain an active state of the one or more sensors while a battery module of the vehicle is charging.

In various examples, the controller of the system may be configured to, by the one or more processors, select a stance adjustment mode based on the stance of the vehicle prior to adjusting the stance, and adjust, with the mechanism, the pitch angle or the roll angle of the vehicle to define the adjusted stance based on the stance adjustment mode.

In various examples, the controller of the system may be configured to, by the one or more processors, monitor for second criteria, and adjust, with the mechanism, the pitch angle or the roll angle of the vehicle to define the adjusted stance in response to detection of the second criteria. In various examples, the second criteria includes the vehicle being shutdown and an indication of a driver exiting the vehicle, based on signals received by the controller from one or more sensors onboard the vehicle.

In various examples, the controller of the system may be configured to, by the one or more processors, generate a notification indicative of the adjusted stance of the vehicle.

In various examples, the mechanism of the system may be a suspension system of the vehicle.

A vehicle is provided that, in one example, includes a suspension system configured to adjust a pitch angle or a roll angle of the vehicle, one or more sensors onboard the vehicle, and a controller in operable communication with the suspension system and the one or more sensors. The controller is configured to, by one or more processors: monitor for first criteria that includes the vehicle being in park and an indication of a presence of water on a surface of the vehicle based on signals received by the one or more sensors, determine a stance of the vehicle relative to gravity in response to detection of the first criteria, select a stance adjustment mode based on the stance of the vehicle, monitor for second criteria that includes the vehicle being shutdown and an indication of a driver exiting the vehicle based on signals received from the one or more sensors, and adjust, with the suspension system, the pitch angle or the roll angle of the vehicle to define an adjusted stance of the vehicle sufficient for the surface of the vehicle to exceed a drainage angle and thereby promote a directional flow of water from the surface, wherein the pitch angle or the roll angle is adjusted based on the stance adjustment mode and in response to detection of the second criteria.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Examples of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that examples of the present disclosure may be practiced in conjunction with any number of systems, and that the systems described herein is merely examples of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example of the present disclosure.

Figure 1:
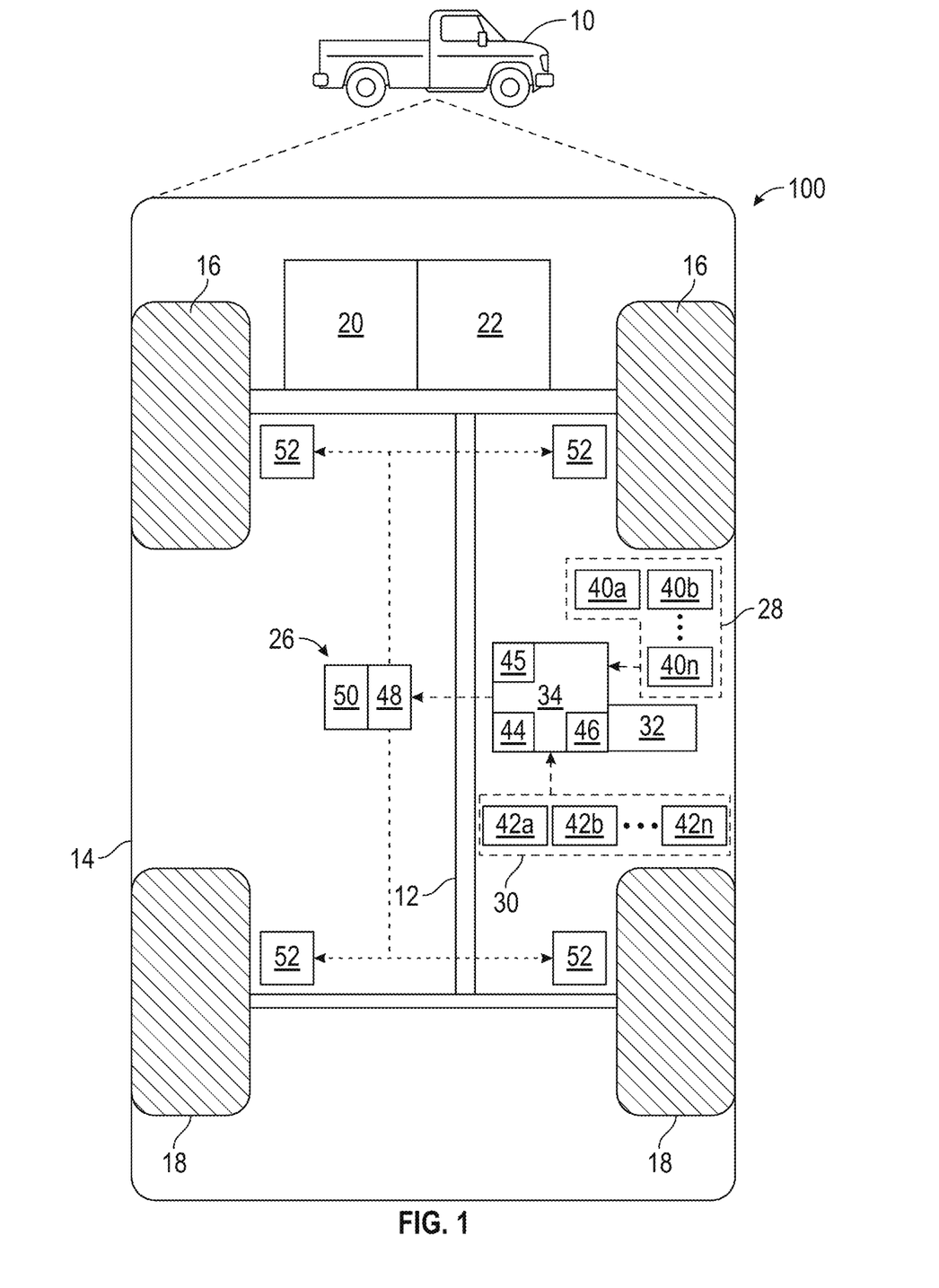
FIG. 1 is a functional block diagram of a vehicle having a water drainage system in accordance with an example.

FIG. 1 illustrates a vehicle 10, according to an example. In certain examples, the vehicle 10 comprises an automobile. The vehicle 10 includes a water drainage system 100 for draining water from surfaces of the vehicle, for example, after being exposed to rain.

In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 further includes a propulsion system 20, a transmission system 22, a suspension system 26, a sensor system 28, an actuator system 30, at least one data storage device 32, and at least one controller 34. The propulsion system 20 includes an engine and/or motor such as an internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheels 16, 18 according to selectable speed ratios. According to various examples, the transmission system 22 may include a step-ratio automatic transmission, a continuously-variable transmission, or other appropriate transmission.

The suspension system 26 is configured to support the weight of the vehicle 10, absorb shocks from the roadway, and provide a comfortable and stable ride for occupants. In various examples, the suspension system 26 is an air suspension system configured to raise and lower the vehicle 10 by controlling an amount of air pumped into or released from airbags or air springs 52, which are located adjacent to each of the wheels 16, 18. The suspension system 26 may include various components such as, but not limited to, the air springs 52 configured to expand or contract based on air pressure, a compressor 50 configured to provide pressurized air to inflate the air springs 52, an air reservoir (not shown) to hold pressurized air for quicker adjustments, height sensors configured to monitor the trim or ride height of the vehicle 10 and transmit signals indicative thereof to a control system or module 48, the control module 48 in operable communication with the compressor 50, air release valves (not shown), and the height sensors to maintain or adjust the trim height of the vehicle 10, and air lines and valves (not shown) configured to route air to and from the air springs. In general, to raise the vehicle 10 the control module 48 may instruct the compressor 50 to pump air into the air springs 52 and thereby increase air pressure therein causing the air springs 52 to expand, which raises the vehicle 10. To lower the vehicle 10, the control module 48 may open one or more valves to release air from the air springs 52, decrease the air pressure therein, causing the air springs 52 to contract, lowering the vehicle 10.

The sensor system 28 includes one or more sensing devices 40a-40n that sense observable conditions of the exterior environment, the interior environment, and/or a status or condition of a corresponding component of the vehicle 10 and provide such condition and/or status to other systems of the vehicle 10, such as the controller 34. It should be understood that the vehicle 10 may include any number of the sensing devices 40a-40n. The sensing devices 40a-40n can include, but are not limited to, current sensors, voltage sensors, temperature sensors, moisture sensors, optical cameras, thermal cameras, pressure sensors, and/or other sensors.

The actuator system 30 includes one or more actuator devices 42a-42n that control one or more vehicle features such as, but not limited to, the propulsion system 20, the transmission system 22, and/or the suspension system 26.

The data storage device 32 stores data for use in controlling the vehicle 10 and/or systems and components thereof. As can be appreciated, the data storage device 32 may be part of the controller 34, separate from the controller 34, or part of the controller 34 and part of a separate system. The storage device 32 can be any suitable type of storage apparatus, including various different types of direct access storage and/or other memory devices. In one example, the storage device 32 comprises a program product from which a computer readable memory device can receive a program that executes one or more examples of one or more processes of the present disclosure, such as the steps of the process discussed further below in connection with FIG. 6. In another example, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms, and generate data based on the logic, calculations, methods, and/or algorithms. Although only one controller 34 is shown in FIG. 1, examples of the vehicle 10 can include any number of controllers 34 that communicate over any suitable communication medium or a combination of communication mediums and that cooperate to process the sensor signals, perform logic, calculations, methods, and/or algorithms, and generate data.

As can be appreciated, that the controller 34 may otherwise differ from the example depicted in FIG. 1. For example, the controller 34 may be coupled to or may otherwise utilize one or more remote computer systems and/or other control systems, for example as part of one or more of the above-identified vehicle devices and systems. It will be appreciated that while this example is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain examples. It will similarly be appreciated that the computer system of the controller 34 may also otherwise differ from the example depicted in FIG. 1, for example in that the computer system of the controller 34 may be coupled to or may otherwise utilize one or more remote computer systems and/or other control systems. In some examples, the controller 122 may include one or more electronic control units (ECUs) in operable communication via a controller area network (CAN) of the vehicle 10.

In various implementations, the vehicle 10 can further include interior and/or exterior vehicle features such as, but are not limited to, doors, a trunk or bed, and cabin features such as air, music, lighting, etc.

The water drainage system 100 is configured for draining water from surfaces of the vehicle 10. For convenience, various aspects of the water drainage system 100 will be discussed in reference to draining rainwater 90 from a bed 56 of the vehicle 10; however, the systems and methods disclosed herein are not limited to this application and may be used for draining water from other surfaces of other vehicles (e.g., hood, roof, battery, ledges, etc.). Broadly, the water drainage system 100 may use, for example, the suspension system 26 to adjust a pitch angle or a roll angle of the vehicle 10 sufficient for a surface of the vehicle 10 to exceed a drainage angle and thereby promote a directional flow of water from the surface. As used herein, the term drainage angle refers to an angle of the surface to be drained necessary to initiate the flow of the water from the vehicle 10.

Figure 2:
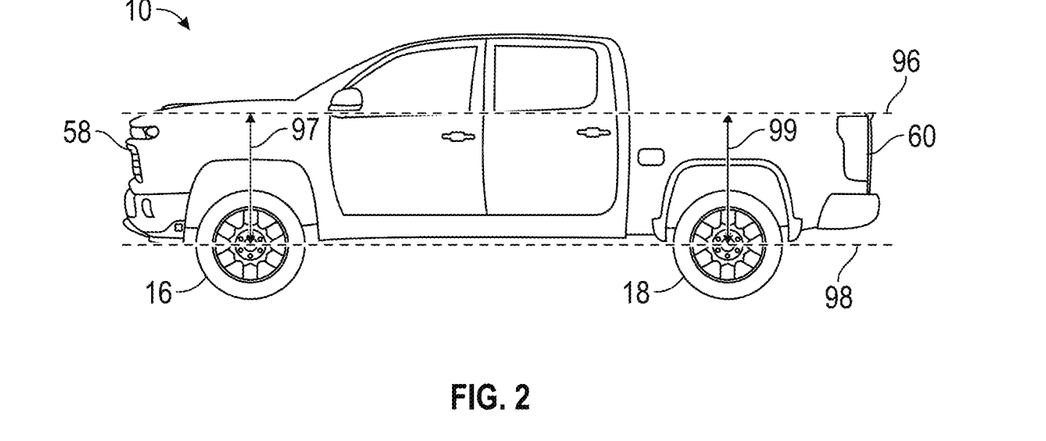
FIG. 2 is a side view illustrating an initial stance of the vehicle of FIG. 1 during use of the water drainage system in accordance with an example.
Figure 3:
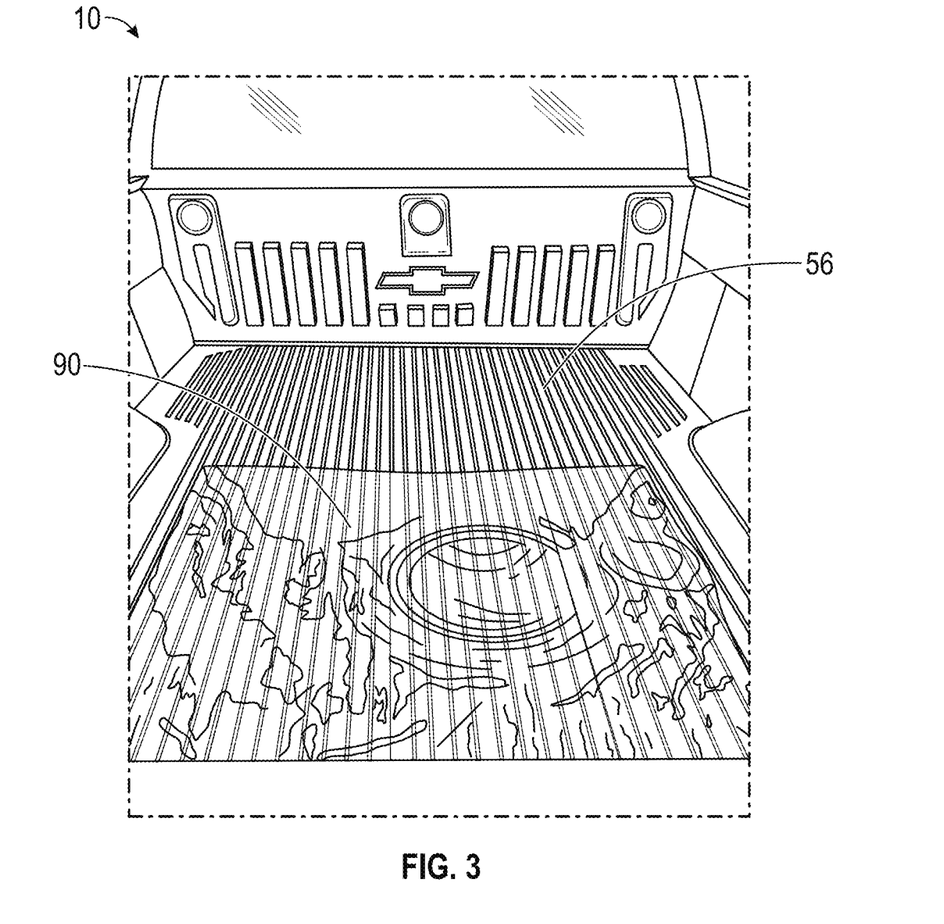
FIG. 3 is a rear view illustrating the presence of rainwater in a bed of the vehicle of FIG. 1 in accordance with an example.
Figure 4:
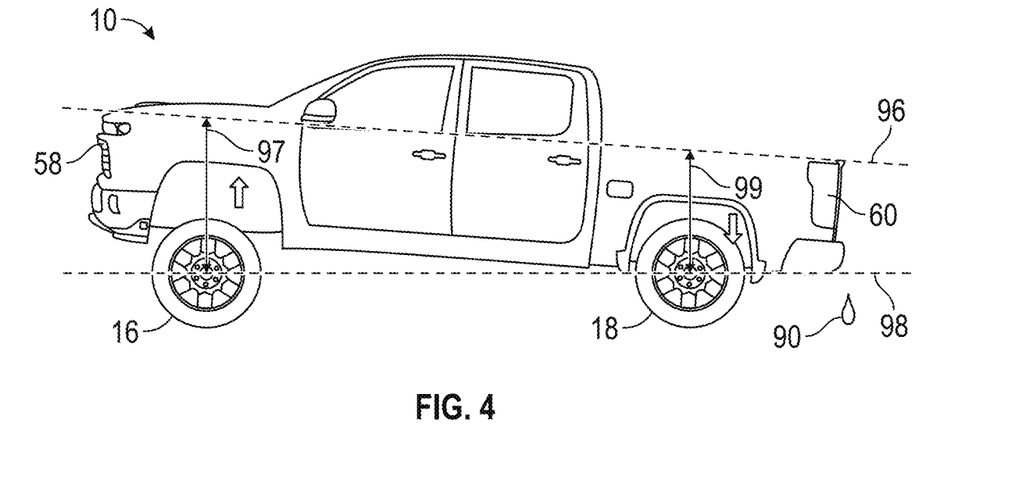
FIG. 4 is a side view illustrating an adjusted stance of the vehicle of FIG. 1 during use of the water drainage system in accordance with an example.

For example, FIG. 2 represents the vehicle 10 as parked on a relatively level surface and having a level stance as indicated by the relative angles or dimensions between a first line 96 corresponding to a position of the frame of the vehicle 10 due to the suspension system 26 and a second line 98 corresponding to positions of the wheels 16, 18. For clarity, first and second dimensions 97, 99 are provided that are aligned with centers of the wheels 16, 18, respectively, and extend directly between the first and second lines 96, 98. As represented, the level stance of the vehicle 10 corresponds to the first and second dimensions 97, 99 being equal. FIG. 3 represents the rainwater 90 pooled in the bed 56 of the vehicle 10. FIG. 4 represents the stance of the vehicle 10 being adjusted to raise a front end 58 thereof and lower a rear end 60 thereof, and thereby pitch the vehicle 10 to promote the flow of the rainwater 90 from the bed 56 toward the rear end 60 of the vehicle 10. While pitched as represented, the first dimension 97 is greater than the second dimension 99.

Figure 5:
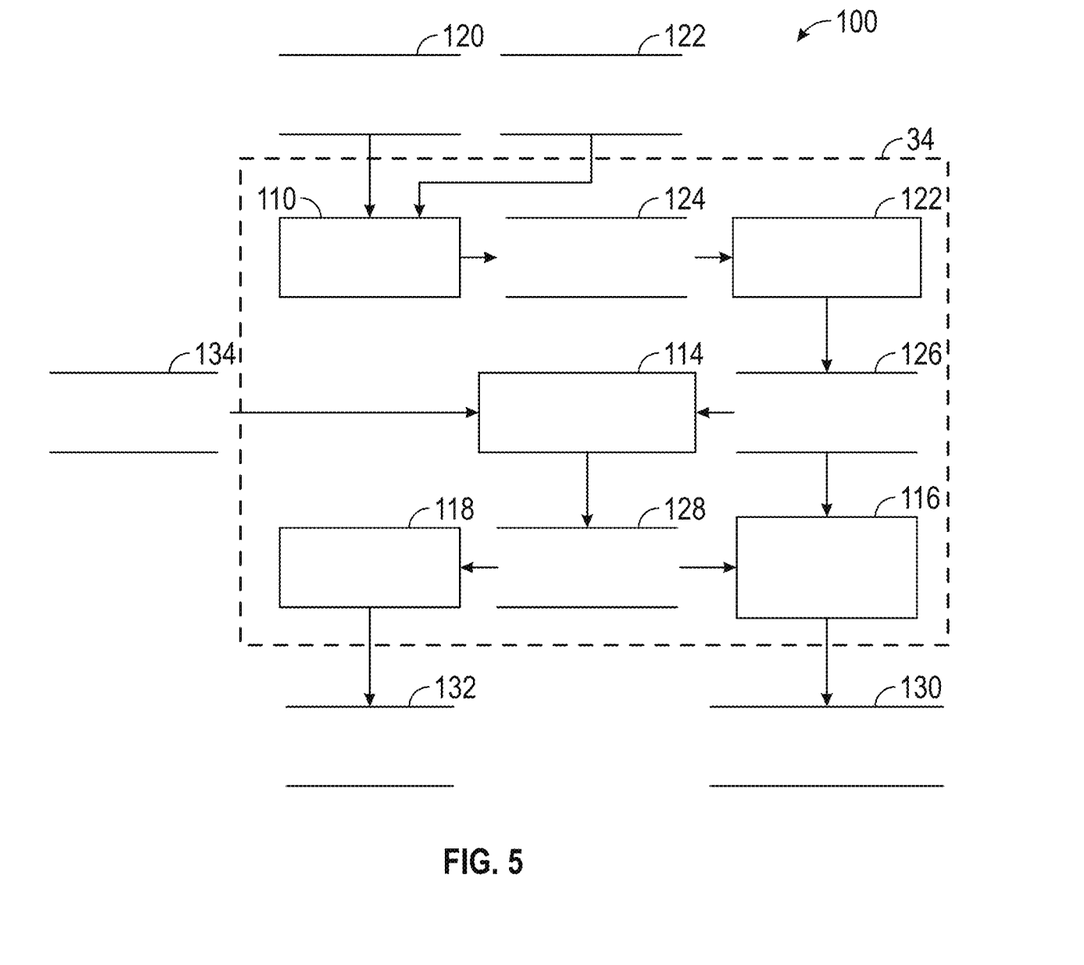
FIG. 5 is a data flow diagram illustrating operation of the water drainage system of FIG. 1 in accordance with an example.

With reference to FIG. 5 and with continued reference to FIGS. 1-4, a dataflow diagram illustrates elements of the water drainage system 100 of FIG. 1 in accordance with various examples. As can be appreciated, various examples of the water drainage system 100 according to the present disclosure may include any number of modules embedded within the controller 34 which may be combined and/or further partitioned to similarly implement systems and methods described herein. Furthermore, inputs to the water drainage system 100 may be received from other control modules (not shown) associated with the vehicle 10, and/or determined/modeled by other sub-modules (not shown) within the controller 34. Furthermore, the inputs might also be subjected to preprocessing, such as sub-sampling, noise-reduction, normalization, feature-extraction, missing data reduction, and the like. In various examples, the water drainage system 100 may include a first criteria module 110, a vehicle stance module 112, a second criteria module 114, a stance adjustment module 116, and a notification module 118.

In various examples, the first criteria module 110 receives as input feature mode data 120 stored in, for example, the computer readable storage device or media 46 and/or the data storage device 32. The feature mode data 120 includes various data indicating an operational parameters or feature mode for the water drainage system 100. In some examples, multiple feature modes may be selectable via a user interface, such as graphic user interface on a touchscreen display device. Nonlimiting examples of feature modes may include "Disabled mode" wherein the water drainage system 100 is disabled, "Enabled on park mode" wherein the water drainage system 100 is enabled in response to the vehicle 10 being shifted to park, and "Enabled on rain mode" wherein the water drainage system 100 is enabled in response to the vehicle 10 being shifted to park and there is an indication that water may be present on a surface of the vehicle 10. For example, a presence of water may be determined in response to windshield wipers of the vehicle 10 set to active, in response to signals received from a moisture sensor, and/or signals received from other sensors.

In various examples, the first criteria module 110 receives as input vehicle data 122 generated by the one or more systems or sensors of the vehicle 10, such as one or more of the sensing devices 40a-40n. The vehicle data 122 includes various data indicating a state of the vehicle 10 such as a stance thereof, presence of water on surfaces thereof, statuses of one or more systems of the vehicle 10 (e.g., windshield wipers active/inactive, shifter position, etc.).

The first criteria module 110 monitors the input vehicle data 122 for first criteria, which may be defined by the feature mode data 120. In some examples, the first criteria includes the vehicle 10 being in park and an indication of a presence of water on a surface of the vehicle 10 based on signals received by the one or more sensors. The first criteria module 110 generates first criteria data 124 in response to detection that the first criteria have been met (e.g., the vehicle 10 is shifted to park and there is a presence of water thereon). The first criteria data 124 includes various data indicating that the first criteria have been met and/or that the water drainage system 100 may be activated.

In various examples, the vehicle stance module 112 receives as input the first criteria data 124 generated by the first criteria module 110. The vehicle stance module 112 determines a stance of the vehicle 10 relative to gravity. As used herein, the stance of the vehicle 10 include estimated pitch and/or roll angles of the vehicle 10, for example, based on lateral and longitudinal acceleration as sensed by an inertial measurement unit (IMU) sensor and/or trim height measurements for each of the four corners of the vehicle 10, for example, based trim heights as sensed by trim height sensors. In some examples, the vehicle stance module 112 may determine a grade or slope of a surface on which the vehicle 10 is parked (i.e., a roadway). Once these parameters have been determined, the vehicle stance module 112 may select a stance adjustment mode based on the stance of the vehicle 10. The stance adjustment mode may define procedures for adjusting the stance of the vehicle 10 to promote the flow of the water thereon. For example, the stance adjustment mode may include instructions to not adjust the stance of the vehicle 10 if the vehicle 10 is on an incline sufficient to result in natural water drainage or a significant decline wherein the suspension system 26 is not capable of sufficient adjustment to achieve a drainage angle (i.e., the water would not drain even at a maximum adjustment). As another example, the stance adjustment mode may include instructions to release pressure only in the air springs 52 at the rear of the vehicle 10 to pitch the vehicle 10 if the vehicle 10 is on a minor incline or decline such that the water is drained with relatively low energy use. As yet another example, the stance adjustment mode may include instructions to release pressure in the air springs 52 at the rear of the vehicle 10 and increase air pressure in the air springs 52 at the front of the vehicle 10 to significantly pitch the vehicle 10 if the vehicle 10 is on a decline that is significant but is within a range of the suspension system 26 to allow the water to be drained. The vehicle stance module 112 generates vehicle stance data 126. The vehicle stance data 126 includes various data indicating the selected stance adjustment mode.

In various examples, the second criteria module 114 receives as input the vehicle stance data 126 generated by the vehicle stance module 112. In various examples, the second criteria module 114 receives as input state and sensor data 134 generated by the one or more systems or sensors of the vehicle 10, such as one or more of the sensing devices 40a-40n. The state and sensor data 134 includes various data indicating a state of the vehicle 10 such as a stance thereof, presence of water on surfaces thereof, statuses of one or more systems of the vehicle 10 (e.g., open/close of door, seatbelt buckled/unbuckled, ignition on/off, vehicle moving/stationary, etc.). If the selected stance adjustment mode provides for operation of the water drainage function (e.g., it is not disabled due to extreme roadway slopes). The second criteria module 114 monitors for second criteria. In some examples, the second criteria includes the vehicle 10 being shutdown (e.g., ignition switch set to off), the vehicle 10 being stationary, and/or an indication of a driver exiting the vehicle 10 (e.g., door sensor senses that the driver's door is opened and then closed, seat occupancy sensor senses driver's seat is empty, etc.). The second criteria module 114 generates second criteria data 128. The second criteria data 128 includes various data indicating that the second criteria has been met and that the water drainage system 100 may adjust the stance of the vehicle 10 based on the stance adjustment mode.

In various examples, the stance adjustment module 116 receives as input the vehicle stance data 126 generated by the vehicle stance module 112 and the second criteria data 128 generated by the second criteria module 114. The stance adjustment module 116 generates stance adjustment data 130 based on the selected stance adjustment mode. The stance adjustment data 130 includes various data indicating specific instructions for the suspension system 26 for adjusting the stance of the vehicle 10, such as which of the air springs 52 to deflate and/or inflate and optionally, by how much (e.g., specific pressures). Notably, any combination of the four air springs 52 may be used to achieve the desired pitch or roll angle. In some examples, the stance adjustment data 130 includes various data indicating specific pitch angles and/or roll angles of the vehicle 10 to define an adjusted stance of the vehicle 10 sufficient for a surface of the vehicle 10 to exceed the drainage angle and thereby promote a directional flow of water from the surface. In such examples, the suspension system 26 may determine which of the air springs 52 to deflate and/or inflate and by how much to achieve the specific pitch angles and/or roll angles. The stance adjustment module 116 transmits the stance adjustment data 130 to the suspension system 26, such as to the control module 48, to initiate the adjustment to the stance.

In various examples, the notification module 118 receives as input the second criteria data 128 generated by the second criteria module 114. The notification module 118 generates notification data 132 that includes various data intended to cause generation of a notification to the driver regarding the adjusted stance of the vehicle 10 upon re-entry and/or upon re-starting the vehicle 10. The notification module 118 transmits the notification data 132 to another system of the vehicle 10 capable of generating such notification such as, for example, a display device. In some examples, the notification data 132 may be transmitted to one or more safety systems of the vehicle 10.

Figure 6:
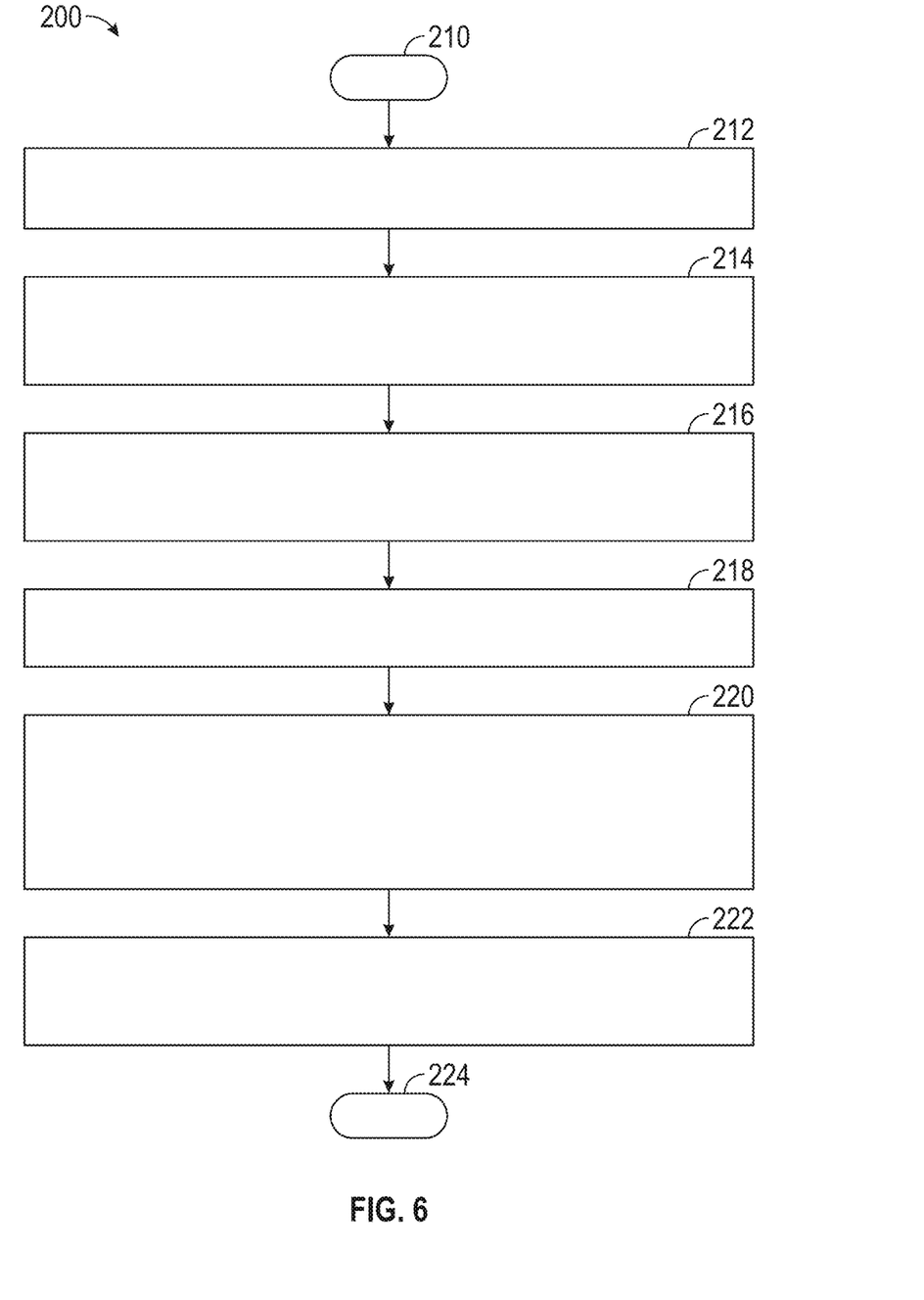
FIG. 6 is a flowchart illustrating a method for draining water from a surface of a vehicle in accordance with an example.

With reference now to FIG. 6 and with continued reference to FIGS. 1-5, a flowchart provides a method 200 for draining water from a surface of a vehicle, such as performed by the water drainage system 100, in accordance with various examples. As can be appreciated in light of the disclosure, the order of operation within the method 200 is not limited to the sequential execution as illustrated in FIG. 6, but may be performed in one or more varying orders as applicable and in accordance with the present disclosure. In various examples, the method 200 can be scheduled to run based on one or more predetermined events (e.g., user activated), and/or can run continuously during operation of the vehicle 10. In some examples, the method 200 may start based on a user selected schedule (e.g., every day at 5:00 am). In some examples, the method 200 may start in response to a windshield wiper switch being turned on.

In one example, the method 200 may start at 210. At 212, the method 200 may include monitoring, with a controller having one or more processors, for first criteria for a water drainage feature of a vehicle. In some examples, the first criteria may be based on a user selected feature mode. In some examples, the first criteria may include the vehicle being in park and an indication of a presence of water on a surface of the vehicle. At 214, the method 200 may include determining, with the controller having the one or more processors, a stance of the vehicle relative to gravity in response the first criteria being met. In some examples, the stance of the vehicle may take into consideration trim heights of each of the corners of the vehicle as determined by a suspension system, and/or a slope of grade of a surface on which the vehicle is on (e.g., a roadway).

At 216, the method 200 may include selecting, with the controller having the one or more processors, a stance adjustment mode based on the stance of the vehicle. The stance adjustment mode may include instructions for how to adjust the stance of the vehicle to promote flow of the water thereon and thereby drain the water from the vehicle. At 218, the method 200 may include monitoring, with the controller having the one or more processors, for second criteria indicative of conditions necessary for implementing the stance adjustment mode. At 220, the method 200 may include adjusting a pitch angle or roll angle of the vehicle sufficient for a surface of the vehicle to exceed a drainage angle and thereby promote a directional flow of water from the surface based on the stance adjustment mode and in response to the second criteria being met. In some examples, this may include adjusting a suspension system of the vehicle to pitch or roll of the vehicle.

In some examples, the vehicle may be maintained in the adjusted stance for a predetermined period of time (e.g., 60 seconds). In some examples, the vehicle may be maintained in the adjusted stance until a third criteria is met such as, for example, a moisture sensor indicating that the rainwater has drained, or until the vehicle 10 is turned on (e.g., ignition set to on).

At 222, the method 200 may include generating, with the controller having the one or more processors, a notification indicative of an adjusted stance of the vehicle based on the pitch angle and roll angle thereof. In some examples, the notification may be displayed on a dashboard or a display of the vehicle. The method 200 may end at 224.

In some examples, the method 200 may include maintaining an active state of the water drainage system, the suspension system, and/or one or more sensors of the vehicle while a battery module of the vehicle is charging. In this manner, the water drainage system may be capable of draining rainwater than accumulates during charging even while the vehicle has been shutdown for some time.

The systems and methods disclosed herein provide various benefits over certain existing systems and methods. For example, the system and methods may reduce a likelihood of rainwater pooling on surfaces of a vehicle for an extended time and may reduce a total volume of water that pools on the surfaces. This in turn may reduce a likelihood of various issues such as rusting, mold or mildew growth, and cargo damage. The systems and methods may provide for relatively frequent, automated water drainage that may result in extended operational life for certain components of a vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:
monitoring, with a controller having one or more processors onboard a vehicle, for a first criteria that includes the vehicle being in park and a presence of water on a surface of the vehicle, based on signals received by the controller from the one or more sensors;
determining, with the controller, a stance of the vehicle relative to gravity in response to detection of the first criteria;
monitoring, with the controller, for second criteria that includes the vehicle being shutdown and an indication of a driver exiting the vehicle, based on signals received by the controller from one or more sensors;
maintaining, with the controller, an active state of the one or more sensors, the controller, and a suspension system of the vehicle, while the vehicle is shutdown and a battery module of the vehicle is charging; and
adjusting, with the suspension system of the vehicle in response to detection of the second criteria, a pitch angle or a roll angle of the vehicle to define an adjusted stance of the vehicle sufficient for the surface of the vehicle to exceed a drainage angle and thereby promote a directional flow of the water from the surface.

2. The method of claim 1, further comprising selecting a first feature mode from more than one feature modes prior to monitoring for the first criteria, wherein the first criteria are defined by the first feature mode.

3. The method of claim 1, further comprising selecting, with the controller having the one or more processors, a stance adjustment mode based on the stance of the vehicle, wherein adjusting the pitch angle or the roll angle of the vehicle to define the adjusted stance is performed based on the stance adjustment mode.

4. The method of claim 1, further comprising generating, with the controller having the one or more processors, a notification indicative of the adjusted stance of the vehicle.

5. The method of claim 1, further comprising maintaining, with the controller, the adjusted stance for a predetermined period of time.

6. The method of claim 1, further comprising maintaining, with the controller, the adjusted stance until the water on the surface has drained as indicated by the one or more sensors.

7. The method of claim 1, wherein a determination that the water is present on the surface is in response to windshield wipers of the vehicle being set to active.

8. The method of claim 1, wherein a determination that the water is present on the surface is in response to a signal received from a moisture sensor.

9. The method of claim 1, wherein monitoring for the first criteria starts at a specific time of day based on a schedule.

10. The method of claim 1, wherein monitoring for the first criteria starts in response to windshield wipers of the vehicle being set to active.

11. A system for a vehicle, comprising:
a suspension system onboard the vehicle configured to adjust a pitch angle or a roll angle of the vehicle;
one or more sensors onboard the vehicle; and
a controller configured to, by one or more processors:
monitor for first criteria includes the vehicle being in park and an indication of a presence of water on the surface, based on signals received by the controller from the one or more sensors;
determine a stance of the vehicle relative to gravity in response to detection of the first criteria;
monitor for second criteria that includes the vehicle being shutdown and an indication of a driver exiting the vehicle, based on signals received by the controller from the one or more sensors;
maintain an active state of the one or more sensors while a battery module of the vehicle is charging; and
adjust, with the suspension system in response to detection of the second criteria, the pitch angle or the roll angle of the vehicle to define an adjusted stance of the vehicle sufficient for the surface of the vehicle to exceed a drainage angle and thereby promote a directional flow of the water from the surface.

12. The system of claim 11, wherein the controller is configured to, by the one or more processors, maintain an active state of the one or more sensors while a battery module of the vehicle is charging.

13. The system of claim 11, wherein the controller is configured to, by the one or more processors:
select a stance adjustment mode based on the stance of the vehicle prior to adjusting the stance; and
adjust, with the suspension system, the pitch angle or the roll angle of the vehicle to define the adjusted stance based on the stance adjustment mode.

14. The system of claim 11, wherein the controller is configured to, by the one or more processors, generate a notification indicative of the adjusted stance of the vehicle.

15. The system of claim 11, wherein the controller is configured to, by the one or more processors, maintain the adjusted stance for a predetermined period of time.

16. The system of claim 11, wherein the controller is configured to, by the one or more processors, maintain the adjusted stance until the water on the surface has drained as indicated by the one or more sensors.

17. The system of claim 11, wherein the controller is configured to, by the one or more processors, determine that the water is present on the surface is in response to windshield wipers of the vehicle being set to active.

18. The system of claim 11, wherein the controller is configured to, by the one or more processors, start monitoring for the first criteria at a specific time of day based on a schedule.

19. The system of claim 11, wherein the controller is configured to, by the one or more processors, start monitoring for the first criteria in response to windshield wipers of the vehicle being set to active.

20. A vehicle, comprising:
a suspension system configured to adjust a pitch angle or a roll angle of the vehicle;
one or more sensors onboard the vehicle; and
a controller in operable communication with the suspension system and the one or more sensors, the controller configured to, by one or more processors:
monitor for first criteria that includes the vehicle being in park and an indication of a presence of water on a surface of the vehicle based on signals received by the one or more sensors;
determine a stance of the vehicle relative to gravity in response to detection of the first criteria;
select a stance adjustment mode based on the stance of the vehicle;
monitor for second criteria that includes the vehicle being shutdown and an indication of a driver exiting the vehicle based on signals received from the one or more sensors;

maintain an active state of the one or more sensors, the controller, and a suspension system of the vehicle, while the vehicle is shutdown and a battery module of the vehicle is charging; and adjust, with the suspension system, the pitch angle or the roll angle of the vehicle to define an adjusted stance of the vehicle sufficient for the surface of the vehicle to exceed a drainage angle and thereby promote a directional flow of water from the surface, wherein the pitch angle or the roll angle is adjusted based on the stance adjustment mode and in response to detection of the second criteria.

\* \* \* \* \*